(12) United States Patent
Hooda et al.

(10) Patent No.: US 12,107,734 B2
(45) Date of Patent: *Oct. 1, 2024

(54) SOFTWARE DEFINED ACCESS FABRIC WITHOUT SUBNET RESTRICTION TO A VIRTUAL NETWORK

(71) Applicant: Cisco Technology, Inc., San Jose, CA (US)

(72) Inventors: Sanjay Kumar Hooda, Pleasanton, CA (US); Muninder Singh Sambi, Fremont, CA (US); Victor Moreno, Carlsbad, CA (US); Prakash C. Jain, Fremont, CA (US); Tarunesh Ahuja, Fremont, CA (US); Satish Kondalam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,451

(22) Filed: Jul. 27, 2023

(65) Prior Publication Data

US 2024/0007353 A1 Jan. 4, 2024

Related U.S. Application Data

(63) Continuation of application No. 18/304,890, filed on Apr. 21, 2023, which is a continuation of application
(Continued)

(51) Int. Cl.
*H04L 41/0893* (2022.01)
*G06F 9/455* (2018.01)
*H04L 12/46* (2006.01)

(52) U.S. Cl.
CPC ...... *H04L 41/0893* (2013.01); *G06F 9/45558* (2013.01); *H04L 12/4633* (2013.01);
(Continued)

(58) Field of Classification Search
CPC ............. H04L 41/0893; H04L 12/4633; H04L 12/4641; G06F 9/45558
(Continued)

(56) References Cited

U.S. PATENT DOCUMENTS 8,316,113 B2 11/2012 Linden et al.
9,025,596 B2 5/2015 Totzke
(Continued)

FOREIGN PATENT DOCUMENTS

WO 2007136863 A2 11/2007

OTHER PUBLICATIONS

International Preliminary Report on Patentability for International Application No. PCT/US2020/012990, mailed Jul. 22, 2021, 07 Pages.
(Continued)

*Primary Examiner* — Zi Ye
(74) *Attorney, Agent, or Firm* — Polsinelli P.C.

(57) ABSTRACT

Systems, methods, and computer-readable storage media are provided for provisioning a common subnet across a number of subscribers and their respective virtual networks using dynamically generated network policies that provide isolation between the subscribers. The dynamic generation of the network policies is performed when a host (e.g. client) is detected (via a switch) as the host joins the computing network via virtual networks. This ability to configure a common subnet for all the subscriber virtual networks allows these subscribers to more easily access external shared services coming from a headquarter site while keeping the separation and segmentation of multiple subscriber virtual networks within a single subnet. This allows the Enterprise fabric to be more simple and convenient to deploy without making security compromises.

21 Claims, 7 Drawing Sheets

Related U.S. Application Data

No. 17/377,378, filed on Jul. 16, 2021, now Pat. No. 11,658,876, which is a continuation of application No. 16/368,624, filed on Mar. 28, 2019, now Pat. No. 11,102,074.

(60) Provisional application No. 62/791,212, filed on Jan. 11, 2019.

(52) U.S. Cl.
CPC ............... *H04L 12/4641* (2013.01); *G06F 2009/45587* (2013.01); *G06F 2009/45595* (2013.01)

(58) Field of Classification Search
USPC ......................................... 709/223
See application file for complete search history.

(56) References Cited

U.S. PATENT DOCUMENTS

| | | |
|---|---|---|
| 2005/0257244 A1 | 11/2005 | Joly et al. |
| 2007/0268516 A1* | 11/2007 | Bugwadia ............ H04L 41/0886 358/1.15 |
| 2008/0037539 A1 | 2/2008 | Paramaguru |
| 2008/0320166 A1 | 12/2008 | Filsfils et al. |
| 2010/0107215 A1 | 4/2010 | Bechtel et al. |
| 2012/0096138 A1 | 4/2012 | Lambert et al. |
| 2012/0151210 A1 | 6/2012 | Perez |
| 2013/0097335 A1* | 4/2013 | Jiang ..................... H04L 69/22 709/245 |
| 2013/0125112 A1 | 5/2013 | Mittal et al. |
| 2014/0280846 A1 | 9/2014 | Gourlay et al. |
| 2015/0200969 A1 | 7/2015 | Leung et al. |
| 2016/0173405 A1 | 6/2016 | Freitas et al. |
| 2017/0005923 A1 | 1/2017 | Babakian |
| 2017/0214633 A1* | 7/2017 | Johnsen ................. H04L 49/65 |
| 2017/0250915 A1* | 8/2017 | Long, III ............ H04L 41/0894 |
| 2017/0289027 A1 | 10/2017 | Ratnasingham |
| 2018/0063194 A1 | 3/2018 | Vaidya et al. |
| 2018/0227195 A1 | 8/2018 | Dumitriu et al. |

OTHER PUBLICATIONS

International Search Report and Written Opinion for International Application No. PCT/US2020/012990, mailed May 11, 2020, 08 Pages.

Panda, Aurojit, et al., "CAP for Networks", HotSDN'13, Aug. 16, 2013, Hong Kong, China, 6 pages.

* cited by examiner

SOFTWARE DEFINED ACCESS FABRIC WITHOUT SUBNET RESTRICTION TO A VIRTUAL NETWORK

CROSS-REFERENCE TO RELATED APPLICATIONS

This application is a continuation of U.S. Non-Provisional patent application Ser. No. 18/304,890, filed Apr. 21, 2023 which in turn, is a continuation of U.S. Non-Provisional patent application Ser. No. 17/377,378, filed Jul. 16, 2021, which in turn, is a continuation of U.S. Non-Provisional patent application Ser. No. 16/368,624, filed Mar. 28, 2019, which in turn, claims the benefit of U.S. provisional patent application No. 62/791,212 filed Jan. 11, 2019, the contents of each are incorporated herein by reference in their entireties.

TECHNICAL FIELD

The subject matter of this disclosure relates in general to the field of computer networking, and more particularly, to systems and methods for software defined access fabric without subnet restriction within a virtual network.

BACKGROUND

An enterprise network can be seen as a communication backbone for the enterprise by connecting computers and other related computing devices across different locations. Furthermore, the enterprise network also provides the enterprise features for obtaining insight regarding the functioning of each computing device connected to the network as well as accessibility to the data associated with each of the computing devices as well.

Depending on the size of the enterprise network, the network itself can be broken up into smaller and more efficient subnetworks. Subnets can allow connected computing devices to communicate with each other within the subnet while utilizing routers to communicate between subnets. Sizes for the subnets can depend on various factors, for example, connectivity requirements and the network technology used with the enterprise network. One example advantage for having multiple subnets within a larger enterprise network is to improve address allocation efficiency and network address utilization. Furthermore, the use of subnets can improve network performance and speed, reduce network congestion, ease administration, and control network growth. Other advantages of using subnets include setting up logical divisions that help maintain separation within the network and improved network security.

BRIEF DESCRIPTION OF THE FIGURES

To provide a more complete understanding of the present disclosure and features and advantages thereof, reference is made to the following description, taken in conjunction with the accompanying drawings, in which.

OVERVIEW

Figure 1:
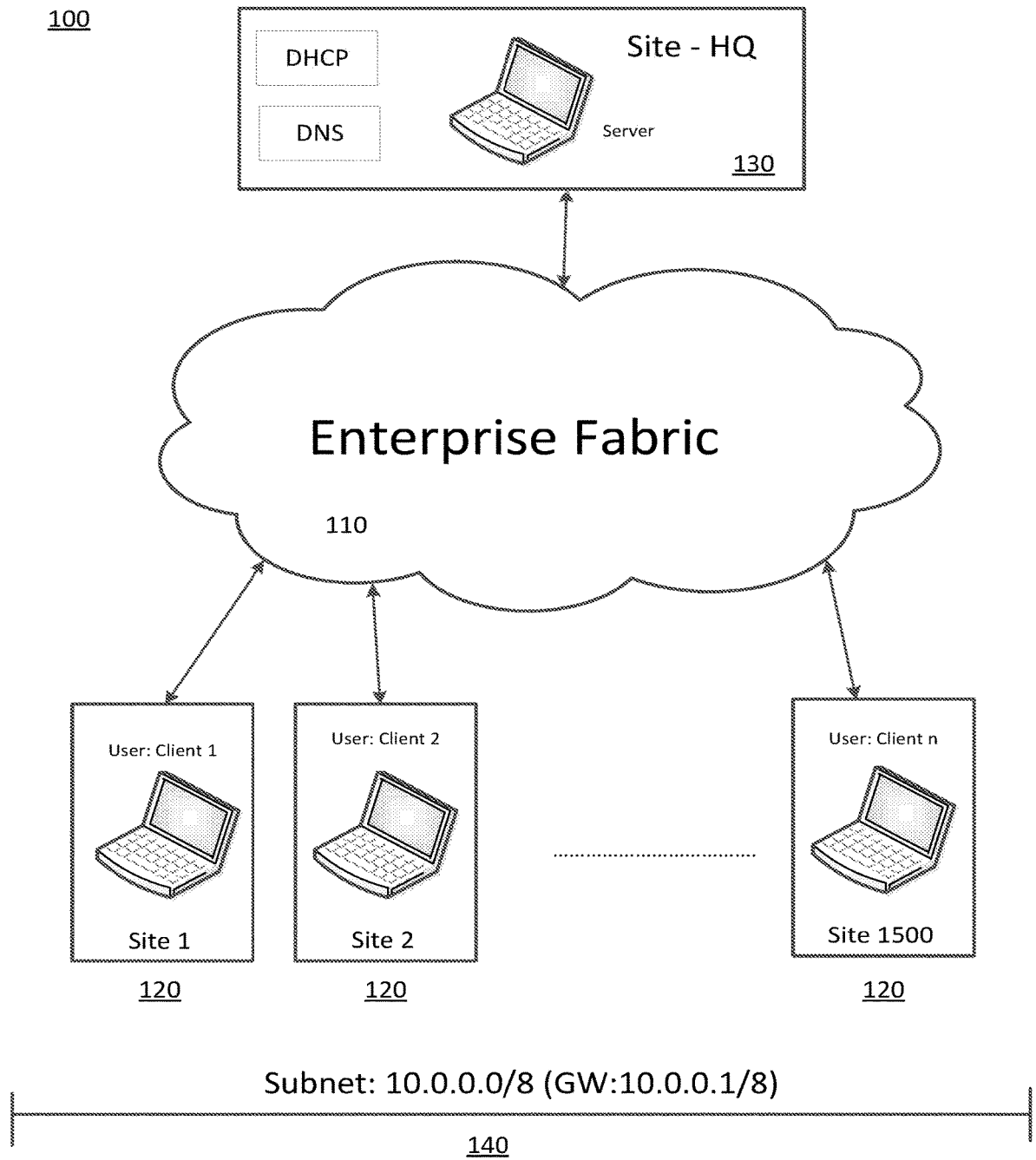
FIG. 1 illustrates an example enterprise network.

Disclosed herein are computer-implemented methods, computer-readable media, and systems for providing software defined access fabric without subnet restrictions to a virtual network. The methods, computer-readable media, and systems relate to receiving notifications from a switch that a host joined an enterprise network. The hosts are then assigned an address within a common subnet associated with the enterprise network. A policy is generated for the host based on the assigned address that includes assigning the host a role associated with the enterprise network (e.g. provider, subscriber). When a data packet transmission request is received at a later time, which includes identification of another host within the common subnet as a destination for the data packet, the generated policies are used to evaluate the request. Instructions are then provided to the switch based on the outcome of the evaluations. For example, if the data packet transmission request corresponds to allowed communication between the two different hosts within the same subnet outlined in the generated policies, instructions to the switch would allow the switch to carry out the data packet transmission. However, if the data packet transmission request corresponds to communications between two different hosts within the common subnet that are not permitted, instructions to the switch would instruct the switch to drop the data packet so that the transmission is not completed.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Enterprises customers may desire a subnet to go to multiple devices with Layer-3 underlay. However, many network implementations restrict a single virtual network (VN) to be associated with one subnet. For example, an enterprise customer with 1500 sites (e.g., one site for each store associated with a retail enterprise customer) may wish to utilize the power of software defined access (SD Access) to manage, group, or separate the sites. SD Access is an intent-based networking solution for an enterprise network environment. The intent-based network treats the computing network as a single system that provides the translation and validation of the business intent (or goals) into the computing network and returns actionable insights. SD Access provides automated end-to-end services (such as segmentation, quality of service, analytics, and so on) for users, computing devices, and application traffic within the computing network. One feature of SD Access is that SD Access automates network user policies so organizations (e.g. enterprises) can ensure the appropriate access control and application experience are set for any user or device to any application across the network. This is accomplished using a single network fabric across a local area network (LAN) and wireless local area network (WLAN) which creates a consistent user experience, anywhere, without compromising on security.

As described herein, each of the sites may have multiple virtual networks (VNs). The enterprise customer may wish to keep the same subnet across all of the sites (which would include each of their respective virtual networks). The enterprise customer may also wish to have common shared resources or services (e.g., Dynamic Host Configuration Protocol (DHCP), Domain Name System (DNS), etc.) for all the sites. However, most current network implementations are unable to keep the same subnet across multiple sites and/or virtual networks thereby providing an embodiment where each subnet would have its own virtual network. The network hardware may also be unable to support the large number of virtual networks that comes with each site having multiple subnets.

Aspects of the subject technology addresses these restrictions and technical obstacles by describing a mechanism where a computing network (e.g., an enterprise fabric) can be provisioned with a common subnet across a number of subscribers while having dynamic network policies that isolate those subscribers from one another. The dynamic generation of the network policies is performed when a host (e.g. client) is detected (via a switch) as the host connects/joins the computing network. This ability to configure a common subnet for all the hosts (e.g. clients) of the Enterprise accessing external shared services while keeping the separation and segmentation of multiple subscribers and their respective virtual networks within a single subnet makes the Enterprise fabric more simple and convenient to deploy with shared service without any security compromise.

Example Embodiments

FIG. 1 illustrates an example enterprise network 100. The enterprise network 100 may have an enterprise fabric that would be used by the enterprise to manage its different sites 120. For example, the enterprise may be a retail customer that wants to be able to manage each of its individually franchised stores (each associated with a different site). Each site 120 may have computing devices (e.g. cashier system) that the enterprise would like to manage using the enterprise fabric 110.

The management of the different sites 120, using the enterprise fabric 110, is performed at a single headquarter site 130. Furthermore, by using the headquarter site 130, the enterprise is also capable of sharing resources and services (for example, via a server at the headquarter site 130) to each of the different sites 120. FIG. 1 provides an example enterprise with 1500 different sites. It should be noted that more or less sites can be present.

It may be desired by the enterprise that each of the sites be assigned to the same subnet 140 (e.g. common subnet). By having each of the sites assigned to the same subnet (as opposed to separate subnets), this simplifies the deployment and management for the different sites associated with the enterprise. As new sites are added and/or removed from the enterprise, these sites can be associated with the same subnet. There would be no need to track the different sites and their corresponding subnet addresses if the sites all are assigned to the same subnet.

Although having each of the different sites be managed by the same subnet would be a desired method of management, as illustrated in FIG. 1, currently there are a number of issues that prevents the embodiment from being effective. Although the exemplary arrangement, illustrated in FIG. 1, allows the enterprise to communicate between the headquarter site 130 with each of the different sites 120 associated with the enterprise fabric 110 assigned at the same subnet, the same can be said about communications between each of the sites 120 within the same subnet. Such communication between sites 120 within the same subnet of the enterprise fabric 110 can be performed, for example, via leaks or broadcasts/multi-cast packet transmission.

Each of the sites can be viewed as an independent entity (e.g. a store owned by a different franchise owner). As such, there may be no need or desire to each the sites be capable of communicating amongst each other. Furthermore, for the purposes of security, it would be desired that the sites 120 themselves be completely isolated from one another (e.g. incapable of communication between each other). Isolation of each of the sites could be possible, for example, if each of the sites 120 is assigned a different subnet whereby each of these subnets are assigned exclusively to a different virtual network. However, having each site be assigned to a different subnet would also further complicate the process of deploying the different sites and associated subnets as well as the management of the different sites and subnets in connection with the headquarter site 130.

Another possible process for maintaining isolation between the different sites 120 within the same subnet 140 could be to use an access LISP (e.g. locator/identifier separation protocol). LISP is a network architecture and protocol that implements the use of two namespaces instead of a single IP address. The namespaces, known as endpoint identifiers (or EID), are associated with each of the end-hosts. The access LISP can then define which hosts (identified via their respective Internet Protocol (IP) addresses) can transmit and receive communications between themselves. The issue, however, is that hosts (and IP addresses) are generally not static. In order for the access LISP to work, each and every IP address for the different sites 120 associated with the common subnet of the enterprise fabric 110 would need to be known. Furthermore, the IP addresses for the different sites 120 cannot change. If, for some reason, some computing devices are moved from one site to a different site, the access LISP would be incapable of identifying if the IP addresses have been re-assigned properly and could potentially fail in managing the communication as originally intended.

Therefore, there is a need for a method that allows the sites to be associated with the same subnet but still have their respective isolation while using their respective virtual networks. The following figures describe in further detail how isolation is provided using some example embodiments.

Figure 2:
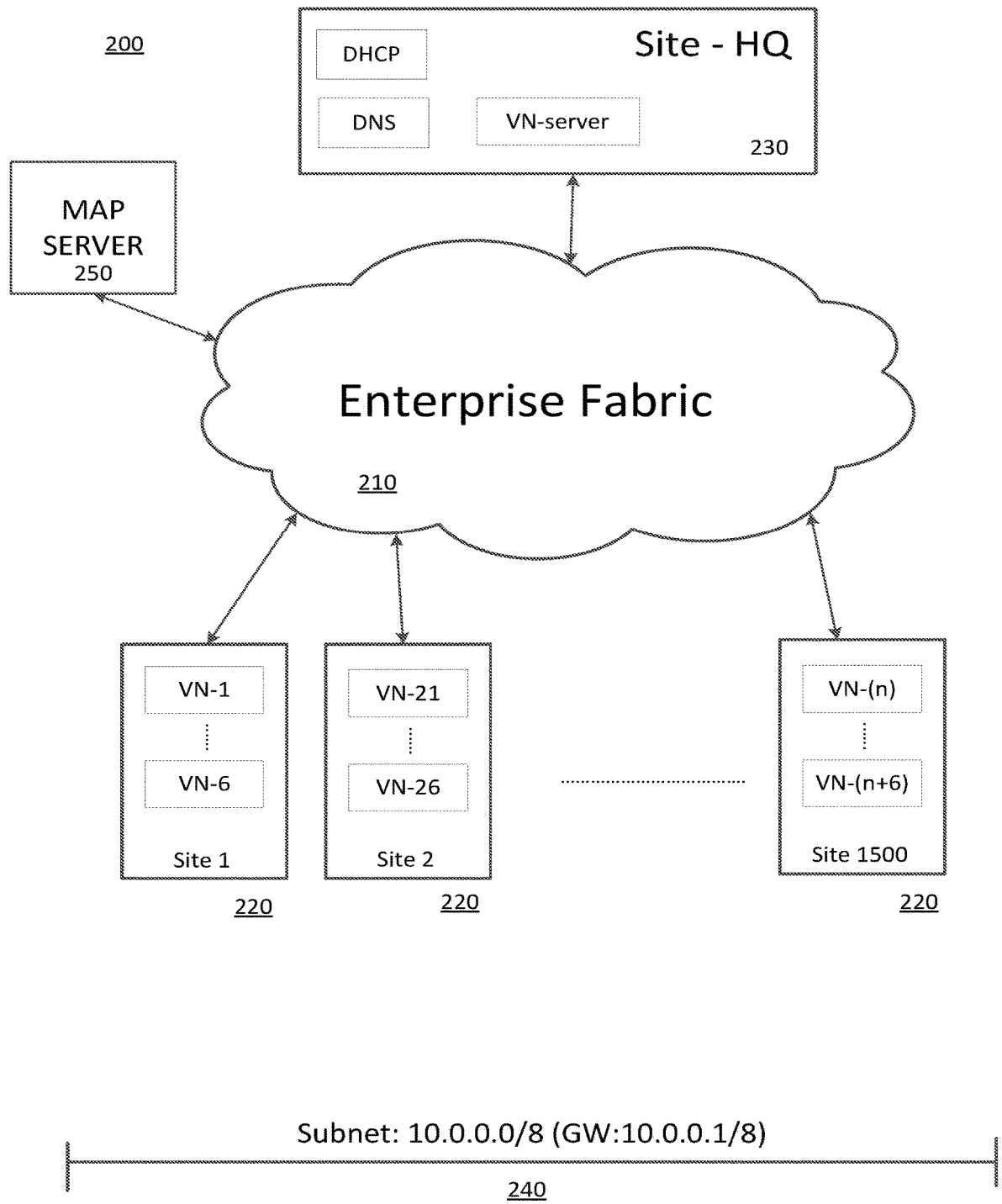
FIG. 2 illustrates an example enterprise network in accordance with an embodiment applying the principles of this disclosure.

FIG. 2 illustrates an example enterprise network 200 in accordance with an embodiment applying the principles of this disclosure. The example enterprise network 200 is similar to the enterprise network illustrated in FIG. 1 except for a couple of features. A first difference pertains to the implementation of various virtual networks (VNs) at each of the different sites 220 and the headquarter site 230. The use of virtual networks would allow the enterprise network 200 to maintain isolation between sites. Subnets provide some isolation via logical division or separation of IP addresses. However, subnet addresses of one host can be routable to other hosts so complete isolation cannot be guaranteed.

Furthermore, the example enterprise network 200 also includes a new feature, a map server 250. The map server 250 (described in further details below) will be used to dynamically generate and enforce network policies. The network policies will be used to define the allowable communication between each of the sites 220 and the headquarter site 230. The network policies are dynamically generated each time a host joins and is detected within the network (e.g. enterprise fabric 210). The dynamic generation of network policies provides greater flexibility as this allows for constantly changing environment (as hosts can join, leave, and re-join at any time). In the scenario that a computing device is taken offline, the previously assigned IP address for that computing device in connection with the enterprise fabric 210 is released and may be picked up by a different host connecting to the network at a subsequent time. If and when the computing device reconnects to the enterprise fabric 210, if the computing device is assigned a new IP address, a new policy would also be created based on the new assignment.

The network (which will also be referred within disclosure as the enterprise fabric 210) provides the capability for an enterprise to connect each of its computing devices so that it can communicate and be managed. As further described in FIG. 3A-FIG. 3C, the network includes various switches that facilitates different hosts in joining and communicating via the network.

Generally, the network (e.g. enterprise fabric 210) can comprise a variety of different planes (not illustrated). For example, the network can comprise an orchestration plane, a management plane, a control plane, and a data plane.

The orchestration plane can assist in the automatic onboarding of edge network devices (such as switches and routers) in an overlay network. The orchestration plane can include one or more physical or virtual network orchestrator appliances that perform the initial authentication of the edge network devices as well as provide connectivity between devices of the control plane and the data plane. In some embodiments, the network orchestrator appliances also enable communication of edge network devices located behind Network Address Translation (NAT). Exemplary network orchestrator appliances that may be used with the present disclosure may include, for example, physical or virtual Cisco® SD-WAN vBond appliances and Cisco® DNA Center.

The management plane can be responsible for central configuration and monitoring of the network. The management plane can include one or more physical or virtual network management appliances that provide centralized management of the network via a graphical user interface (GUI). The GUI allows a user to monitor, configure, and maintain the edge network devices and links (e.g. Internet transport network, multi-protocol label switching (MPLS) network, 4G/LTE network) in an underlay and overlay network. The network management appliances can also support multi-tenancy and enable centralized management of logically isolated networks associated with different entities (e.g. enterprises, divisions within enterprises, groups within divisions, etc.). Alternatively or in addition, the network management appliance(s) can be a dedicated network management system for a single entity. In some embodiments, physical or virtual Cisco® SD-WAN vManage appliances and Cisco® DNA Center can operate as the network management appliance(s).

The control plane can build and maintain a network topology and make decisions on where traffic flows within the network. The control plane can include one or more physical or virtual network controller appliances. The network controller appliances can establish secure connections to each network device and distribute route and policy information via a control plane protocol (e.g., Overlay Management Protocol (OMP), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliances can operate as route reflectors. The network controller appliances can also orchestrate secure connectivity in the data plane between and among the edge network devices. For example, in some embodiments, the network controller appliances can distribute crypto key information among the network devices 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliances.

The data plane can be responsible for forwarding packets based on decisions from the control plane. The data plane can include the edge network devices, which can be physical or virtual network devices. The edge network devices can operate at the edges various network environments of an enterprise, such as in one or more data centers or colocation centers, campus networks, branch office networks, home office networks, and so forth, or in the cloud (e.g., Infrastructure as a Service (IaaS), Platform as a Service (PaaS), SaaS, and other cloud service provider networks). The edge network devices can provide secure data plane connectivity among sites over one or more WAN transports, such as via one or more Internet transport networks (e.g., Digital Subscriber Line (DSL), cable, etc.), MPLS networks (or other private packet-switched network (e.g., Metro Ethernet, Frame Relay, Asynchronous Transfer Mode (ATM), etc.), mobile networks (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices.

The map server 250 will be used to dynamically define the relationship between the headquarter site 230 and each of the sites 220 within the enterprise network 200. Specifically, the headquarter site 230 will be identified, via the policies, as a provider. Each of the sites 220 will be identified as individual subscribers.

The map server 250 is able to implement the isolation between the different sites 220 by generating site-specific policies that only allow communications to be transmitted between a particular site within the subnet with the headquarter site, namely only communications between sites having different roles (e.g. between the provider virtual network and a subscriber virtual network) are allowed. Each of these policies are generated as different entities join and are detected within the same subnet 140. By using the dynamically generated policies, the map server 250 can be used to detect and deny requests corresponding to communications between subscriber sites using the same subnet.

As illustrated in the figure, the map server 250 can be its own separate entity with respect the enterprise fabric 210. However, there may be other embodiments whereby the map server 250 can be part of the headquarters site 230 or part of the enterprise fabric 210 itself (e.g. switches/nodes).

An example network policy command line interface (CLI) is provided below. The network policy command is able to be provided dynamic capabilities with the use of an 'ip-any' keyword which allows the map server 250 to generate policies for any IP address that is detected within the subnet 140.

```
router lisp
site 'site1'
authentication-key uci
eid-record instance-id 1 <subnet_provider_prefix> accept-more-specifics
eid-record instance-id 2 0.0.0.0 accept-more-specifics
eid-record instance-id 2 <subnet_subscriber_prefix> accept-more-specifics
eid-record instance-id 3 <subnet_subscriber_prefix> accept-more-specifics
!
extranet ext1
eid-record-provider instance-id 1
<prefix>
<ip-any>
!
eid-record-subscriber instance-id 2
<ip-any>
!
eid-ecord-subscriber instance-id 3
<ip-any>
!
!
!
```

For the above exemplary policy, the following notes are provided:
- 'router lisp' and 'site' CLI are used to configure the allowed subnet for each virtual network/Instance ID (IID). The common subnet would be configured as part of the site command for all subscriber virtual networks.
- 'router lisp' and 'extranet' CLI configures the enterprise network provider and subscribers for corresponding virtual networks/instance IDs.
- 'ip-any' would be configured as part of the network subscriber configuration for all subscriber virtual networks. For dynamic learning of the hosts and their virtual networks in the network policy, 'ip-any' would allow all valid registrations to be added as allowed hosts and virtual networks in the network policies.
- 'ip-any' also allows both ipv4 as well ipv6 prefixes to be learned for the provider/subscriber as per allowed site configuration.
- Both <ip-any> and <prefix> options can coexist (i.e. both of these option—dynamic learning or static policy prefixes—can be configured for the same provider/subscriber at the same time). The advantage is that a static prefix can be used for less specific EIDs (eg. /24). More specific EIDs (e.g. /32) won't be learned and dynamically added in the network policy since overlapping prefixes are not allowed. This would help the network policies to scale for dynamic EIDs if needed.
- If 0.0.0.0 is used as an allowed site prefix for subscriber virtual networks/instance IDs under site configuration, another non-zero site prefix needs to be configured which would tell the common subnet used for that virtual network. For security, configuration should specify which common subnet joining hosts are part of. If all VN/IID's have 0.0.0.0 configured as allowed prefix, that means all host are allowed for all VNs which is unintended. Intention for 0.0.0.0 site configuration is to allow learning prefixes from a different secured networks (eg data center), not to allow every ip host address. Hence it's advisable to configure each VN's site prefix 0.0.0.0 (to allow learning datacenter prefixes) with a common subnet prefix to restrict host to a secured configured common subnet for dynamic inter VN communication policy.

Figure 3A:
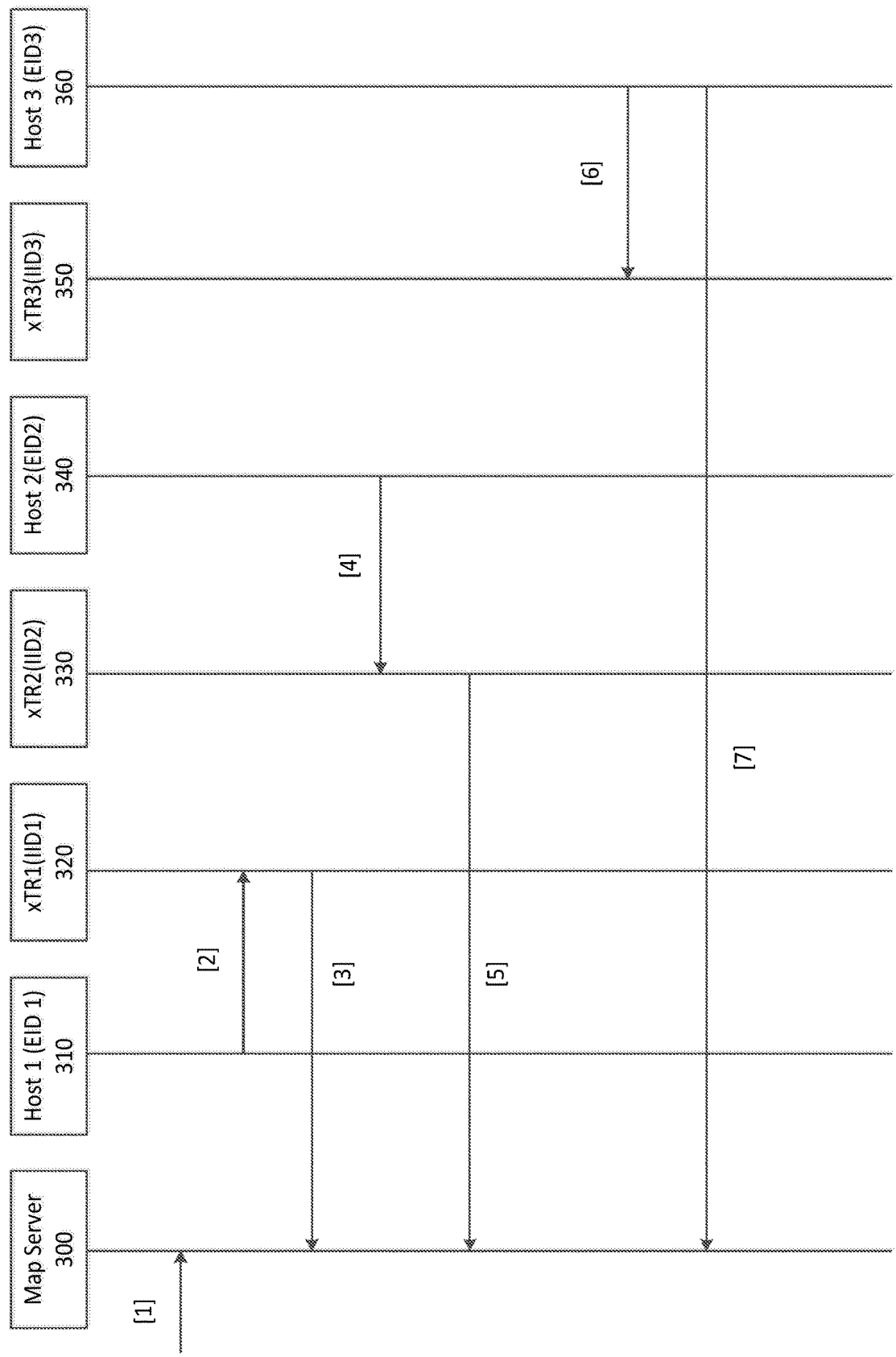
FIG. 3A-FIG. 3C illustrate exemplary flow diagrams for a network management system in accordance with an embodiment.
Figure 3B:
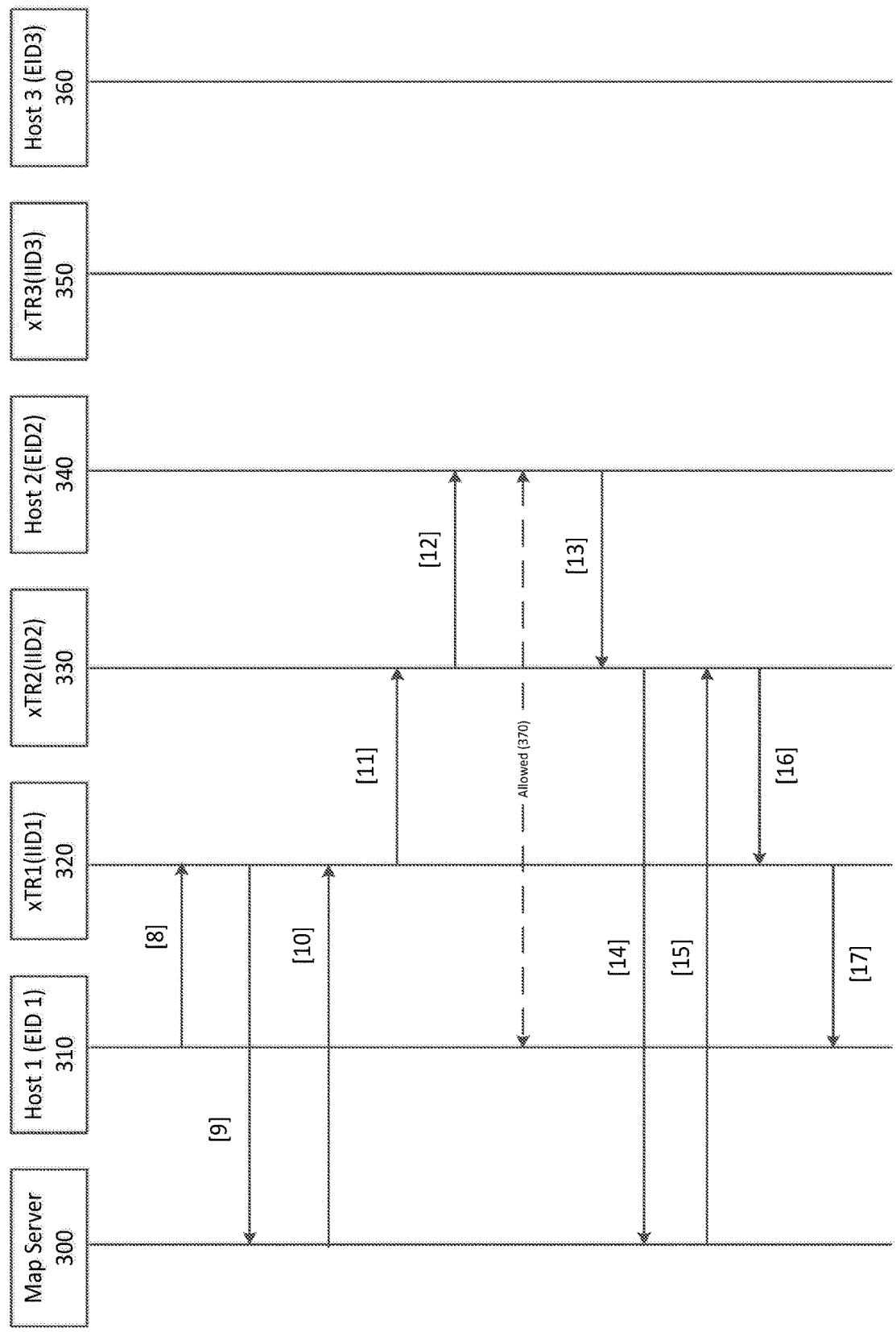
Figure 3C:
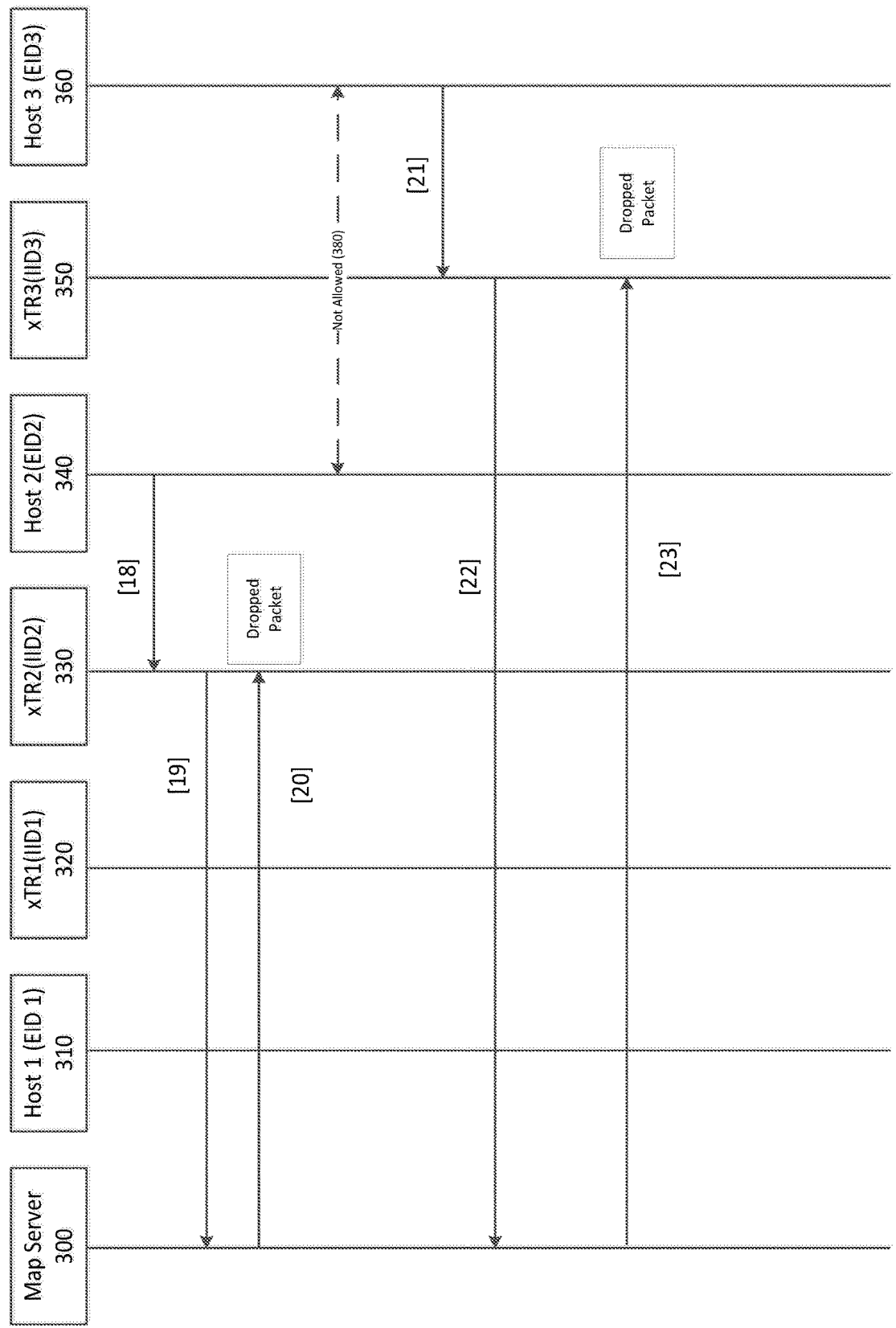

FIG. 3A-FIG. 3C illustrate exemplary flow diagrams for a network management system in accordance with an embodiment. Specifically, FIG. 3A illustrates exemplary flows showing the detection of each host and subsequently dynamically generating network policies for the enterprise network; FIG. 3B illustrates exemplary flows showing allowable communication between a subscriber and the provider; and FIG. 3C illustrates exemplary flows showing what occurs when a non-permitted communication is detected between two subscribers.

With reference to FIG. 3A-FIG. 3C, the exemplary flow diagram includes a number of different entities that are used in connection with the network management system. These entities communicate with each other via messages as the different hosts are detected, the policies are dynamically generated for the detected hosts, determining whether a communication is appropriate, and transmission of the data packets if such communication is allowed. The exemplary entities include the map server 300, each of the hosts 310, 340, 360, and their associated switches 320, 330, and 350.

The map server 300 is responsible for dynamically generating and storing the network policies. The policies, as described above, are used in the present disclosure to maintain isolation between the different subscribers within the subnet. These policies are generated when hosts join and are detected in the network.

Each of the hosts 310, 340, and 360 correspond to different sites that are associated with the network. Each host 310, 340, 360 is identified by their respective endpoint identifiers (EIDs), which in this case would be an IP address. The hosts 310, 340, 360 join the network, are detected, and registered with the network via their respective switches 320, 330, 360.

With message [1], the map server 300 can be configured to define the relationship of which hosts are able to communicate with one another within the enterprise fabric. It is here that the map server 300 is configured to define the headquarter site (illustrated as H1 in FIG. 3A) as the provider and that the headquarter site would be allowed to communicate with any of the other hosts (defined as different subscribers). The map server 300 is also configured, at this point, to register any subsequent hosts (and their respective IP addresses) that join the enterprise fabric and are detected by the switches as being subscribers. These subscribers would not be allowed to communicate between each other using the generated network policies.

The identification of which host should be identified as the provider and which hosts are identified as subscribers can be carried out, for example, by having the map server be configured to identify which virtual networks are associated with the provider and which virtual networks are associated with subscribers. Hosts that need shared services would be instructed to connect to the enterprise fabric using virtual networks specific to subscribers. In contrast, hosts that are associated with the shared services server (e.g. headquarter site) will be instructed to connect using virtual networks specific to the provider.

As hosts join and leave the enterprise fabric, the map server 300 will automatically detect the IP addresses of these hosts and dynamically generate corresponding policies that allows the new subscribers to communicate with the headquarter site (e.g. provider). If for some reason a host leaves the enterprise fabric the previously assigned IP address can be released back and associated policies are deleted (so the old IP address can be reused for the next host joining the enterprise fabric). When that host rejoins, it may be reassigned a new IP address and correspondingly be associated with new policies that are generated. In this way, the dynamic policies are available to prevent any subscribers (e.g. new or existing) from communicating with other subscribers that are currently associated with the same subnet of the enterprise fabric. The map server 300 and its associated policies can institute and maintain the desired isolation between the different hosts/sites that have virtual networks associated with the same subnet.

With messages [2], [4], and [6], the host (e.g. site) sends a message to their respective switch 320, 330, 350. These messages [2], [4], and [6] are detected by the switches 320, 330, 350 as the hosts joining the enterprise network. The switches 320, 330, 350 can communicate with the map server 300 via messages [3], [5], and [7] in order to register the detected host with the map server 300. Based on the initial definition of the relationships provided in message [1], the hosts will have their identification (e.g. IP addresses) added to the policies stored therein.

For example, when host2 340 joins the enterprise fabric and is detected via message [4] by the corresponding switch (xTR2) 330, the switch (xTR2) 330 can then register the host2 340 at the map server 300. In some embodiments, the map server 300 may require validation of authentication keys to determine whether the host2 340 is allowed within the subnet based on possible definitions provided in message [1]. When the map server 300 allows host2 340 to be registered, based on the definition provided in message [1], host2 may be defined as a subscriber within the enterprise fabric. The map server 300 will generate a corresponding policy that would allow host 2 to communicate with only the host identified as the provider (which would be host1 310) as illustrated in FIG. 3A). A policy is generated by the map server 300 whenever a new host joins the enterprise fabric. Even when a host leaves and re-joins the enterprise fabric, if the host is assigned a different identifier (e.g. IP address), the policies within the map server 300 would account for that by generating a new policy for that host.

FIG. 3B illustrates the messages that are sent when two hosts (specifically host that has been defined as a provider and a different host that is defined as a subscriber) attempt to communicate with each other within the enterprise fabric. In particular, message [8]-message illustrates the steps to determine whether a communication from Host 1 310 can be provided to Host 2 340. Meanwhile, messages [13]-[17] provide the reverse scenario illustrating the steps to determine whether a communication from Host 2 310 can be provided to Host 1 310.

In the figure, Host 1 310 and Host 2 340 wish to communicate with each other via the enterprise fabric. Message [8] illustrates that a data packet is being provided from Host 1 310 (which is defined as a provider) to its respective switch (xTR1) 320. The packet indicates that the source is coming from Host 1 310 and would like to be provided to Host 2 340 as the destination. Upon receiving the data packet from Host 1 310, the switch (xTR1) 320 sends message [9] to the map server 300.

Message [9] is provided to the map server 300 to identify whether the communication between Host 1 310 and Host 2 340 is appropriate based on the network policies at the map server 300. If there is a generated policy within the map server 300 that approves that the communication between Host 1 310 and Host 2 340 is appropriate, the map server 300 provides IP address of Host 2 340 back to the switch (xTR1) 320 via message so that the switch (xTR1) 320 knows where to transmit the data packet.

Once confirmation that communication can be performed between Host 1 310 and Host 2 340, the data packet is encapsulated so that it can be provided to Host 2 340 via message [11]. The data packet is encapsulated, for example, to provide encryption so that the data packet can be transmitted safely and securely across the enterprise fabric. The encapsulated data packet is delivered from the switch (xTR1) associated with Host 1 310 to the switch (xTR2) 330 associated with Host 2 340. Once received at the switch (xTR2) 330, the data packet is de-capsulated and provided to the destination Host 2 340 as originally intended via message [12].

In connection with the latter half of FIG. 3B, the reverse scenario whereby Host 2 340 would attempt to communicate with Host 1 310 is described. Message illustrates that a data packet is being provided by Host 2 340 to its respective switch (xTR2) 330. The data packet provides information pertaining to the source being associated with Host 2 340 and the desired destination of Host 1 310. The switch (xTR2) 330 then provides message to the map server 300 to determine whether the data packet can be transmitted to Host 1 310.

The map server 300 would evaluate each of the policies stored therein to ensure that Host 2 340 is not attempting to communicate with a different host that is also defined as a subscriber. Because the map server 300 would be able to identify that Host 1 310 is actually the provider associated with the enterprise network based on the stored policies, the map server 300 can provide confirmation back (via message [15]) that the data packet can be transmitted from Host 2 340 to Host 1 310. Once the confirmation has been received via message [15], the data packet can be similarly encapsulated for security purposes and sent to the switch (xTR1) associated with Host 1 310 via message [16]. The data packet is then de-capsulated and provided to Host 1 310 via message [17].

For reference, the dotted line 370 illustrates that communication between Host 1 310 (which is defined as a provider) would be allowed with Host 2 340 (which is defined as a subscriber) based on the policies generated and stored within the map server 300. At least within this embodiment, the generated policies stored within the map server 300 are used to ensure that a provider and a subscriber are the two entities seeking to communicate with each other via the enterprise fabric.

In connection with FIG. 3C, example scenarios are described where two hosts (defined as subscribers within the same subnet) attempt to communicate with each other. Here, the map server 300 utilizes the policies to prevent such communication so that isolation can be enforced between the two hosts. In particular, messages [18]-[20] are directed to attempts by Host 2 340 to communicate with Host 3 360 while messages [21]-[23] are directed to attempts by Host 3 360 to communicate with Host 2 340.

With message [18], a data packet is being provided from Host 2 340 to switch (xTR2) 330. The data packet includes information such as the source (being Host 2 340) and the destination being Host 3 360. The switch (xTR2) 330 will communicate with the map server 300 (via message [19]). Here the map server 300 will review the policies to determine if communication between Host 2 340 and Host 3 360 is allowed. Whereas, in FIG. 3B, communication was being performed between a provider and a subscriber within the enterprise fabric, here the map server 300 concludes that Host 2 340 is attempting to communicate with another subscriber Host 3 360. This conclusion is reached by identifying that both Host 2 340 and Host 3 360 have been defined as subscribers within the same subnet and based on the initial definition (provided in message [1] of FIG. 3A), such a communication would not be allowed within the present enterprise fabric. Therefore the map server 300 provides a negative reply back via message [20]. This negative reply instructs the data packet to be dropped by the switch (xTR2) 330 so that it cannot be sent to Host 3 360.

In the scenario where a data packet is being provided from Host 3 360 to its switch (xTR3) 350 via message providing information that the data packet is intended for Host 2 340, the switch (xTR3) 350 would communicate with the map server 300 to determine whether such communication would be appropriate (via message [22]). Similar to the scenario described above, the map server 300 will notice, based on the stored network policies, that Host 3 360 is attempting to communicate with another subscriber within the same subnet. Therefore, the map server 300 will again provide a negative reply back via message [23]. This negative reply instructs the data packet to be dropped by the switch (xTR3) 350 so that it cannot be sent to Host 2 340.

For reference, the dotted line 380 illustrates that communication between Host 2 310 (which is defined as a subscriber) is not allowed with other subscribers (e.g. Host 3 360) based on the policies generated and stored within the map server 300. At least within this embodiment, the generated policies stored within the map server 300 are used to institute and maintain the isolation between different sites/hosts. By forcing the data packets to be dropped in this manner, the map server 300 can maintain isolation between subscribers within the same subnet while still allowing each subscriber to communicate with the provider as needed.

Figure 4:
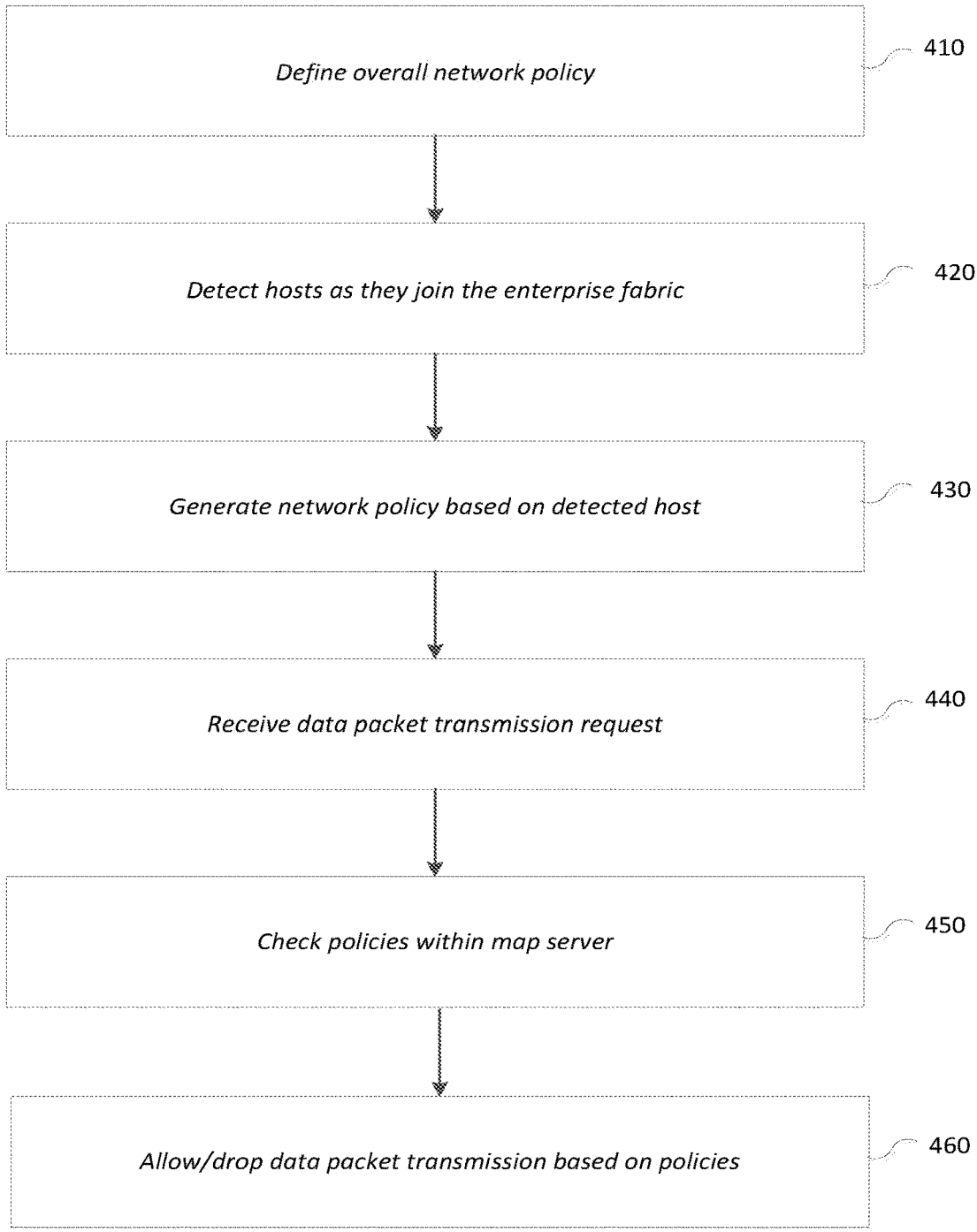
FIG. 4 illustrates an example method according to an aspect of this closure.

FIG. 4 illustrates an example method 400 according to an aspect of this disclosure. The method 400 describes the various steps for establishing an enterprise fabric that allows for multiple sites (defined as subscribers) to co-exist within the same subnet while still maintaining isolation between the different sites. Furthermore, each of the subscribers would still be allowed to communicate with the headquarter site (defined as the provider) within the enterprise fabric with the headquarter site also being capable of sharing resources and services with each of the subscribers.

In step 410, the map server is configured to allow only communication between a provider and a subscriber within the enterprise fabric. Furthermore, the map server can also be configured to allow certain hosts to connect to the enterprise fabric and may also determine what hosts can be defined as being the provider. Here, the use of 'ip-any' prefixes within the map server provides for a dynamic learning environment where valid hosts (defined as subscribers) would be provided a specific policy that would allow those hosts to communicate with the provider and to have resources and services from the provider shared.

In step 420, the enterprise fabric detects the hosts as they join the enterprise network. The hosts are detected when they communicate with switches that provide the hosts access to the enterprise network.

The switches then forward the host information to the map server in step 430. While at the map server, validation can be performed to determine if the host is allowed to access the enterprise network. If authorized, the host can be assigned an IP address within a subnet. Based on the initial configuration of the map server in step 410, the host can be defined as either the provider or a subscriber. If identified as a subscriber for the enterprise fabric, policies will be dynamically generated describing that the host would only be allowed to communicate with the host defined as the provider. Any other communications (e.g. subscriber to another subscriber) will be denied. The map server and its generated policies are used to maintain the isolation between the different hosts/subscribers within the same subnet.

Because the policies can be generated as hosts join the enterprise fabric, if for some reason one or more hosts leave and re-join at a later time, new policies would be created for these hosts. This allows for coverage of scenarios where hosts are assigned different IP addresses thereby providing policies that are dynamic based on the circumstances associated with the enterprise fabric.

In step 440, data packet transmission request can be provided. In particular, a host may provide a data packet to a switch so that it can be transmitted to another host within the enterprise fabric.

When the data packet is received by the switch, the switch communicates with the map server in step 450 in order to determine whether the transmission request/communication is appropriate. The policies generated in step 430 will detail which host (e.g. subscriber) which host (e.g. provider) can be communicated with. Based on the policies stored within the map server, the map server would provide an appropriate response in step 460.

If the data packet is indeed between a source host defined as a subscriber and a destination host defined as a provider, the map server will provide confirmation that the transmission can continue. The data can then be transmitted between the two hosts. However, if the data packet is determined to attempt transmission between two hosts that are defined as subscribers within the same subnet, the map server would provide instructions for the data packet to be dropped (e.g. the transmission is not completed).

By using the embodiment described above in the example method 400, an enterprise would be capable of having multiple sites associated with the same subnet allowing a headquarter site to manage and share resources/services with each of those sites efficiently. Furthermore, the map server and its dynamically generated policies would provide the isolation (and security) between the different sites/subscribers by preventing these sites from communicating amongst themselves.

Figure 5A:
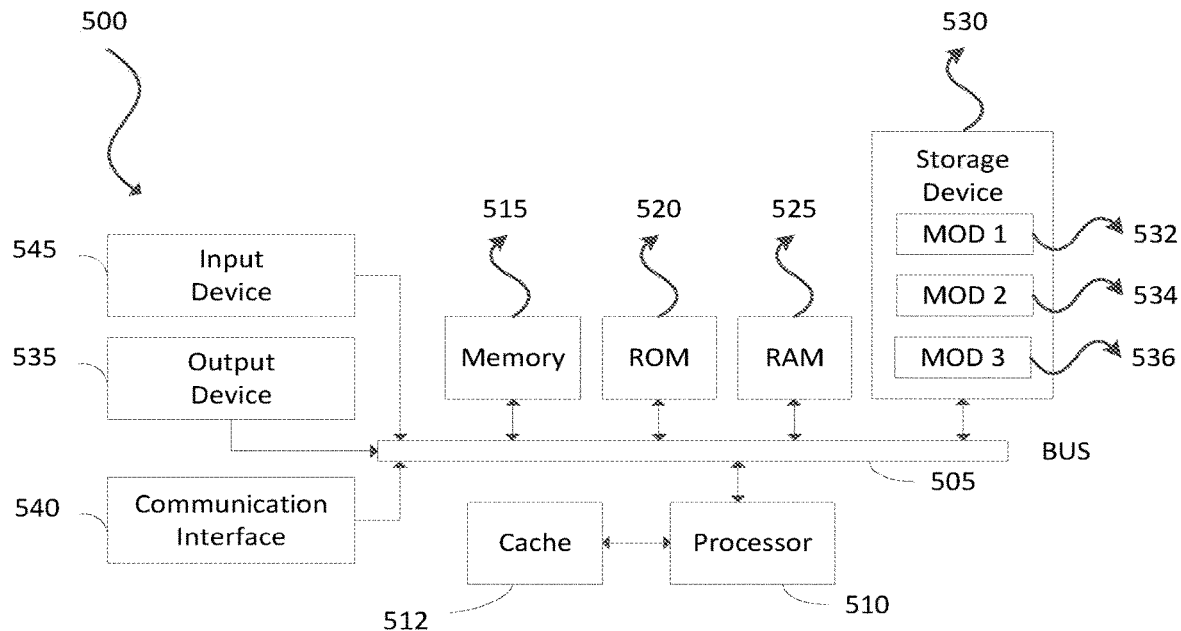
FIG. 5A and FIG. 5B illustrate examples of systems in accordance with some embodiments.
Figure 5B:
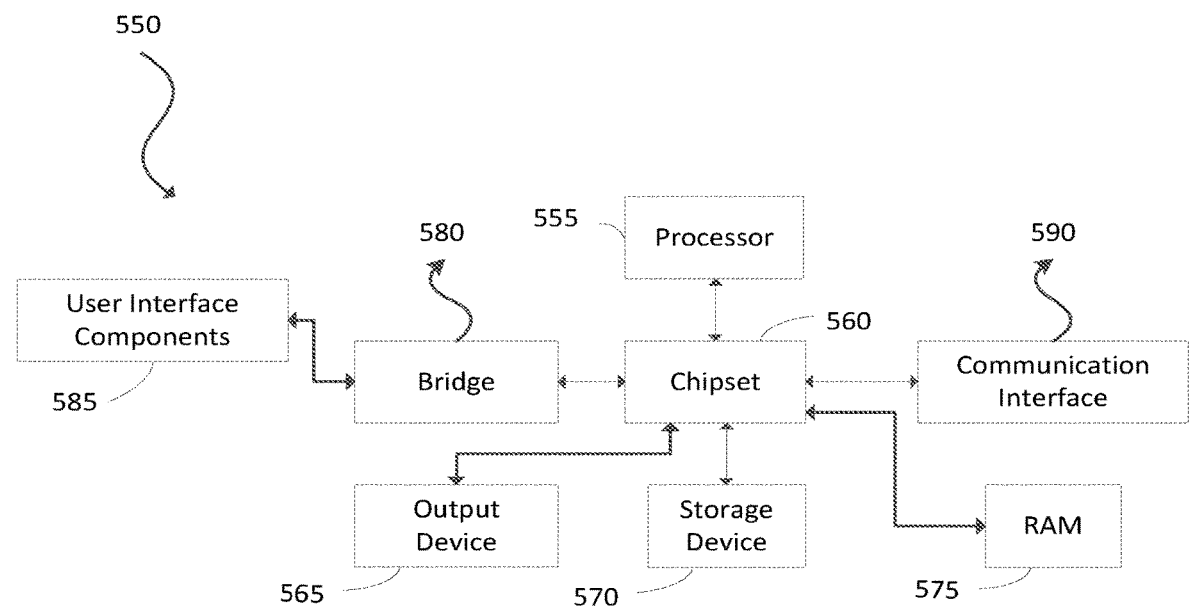

FIG. 5A and FIG. 5B illustrate examples of systems in accordance with some embodiments. The example systems can be implemented, for example, with respect to the provider/headquarter site and each of the subscribers/sites as illustrated in FIG. 1 and FIG. 2.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of highspeed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software modules 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, solid state media, and other suitable storage media. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A non-transitory computer-readable medium storing instructions which, when executed by a computer device, causes the computer device to perform operations comprising:
   discovering, based on one or more messages from one or more switches, that a plurality of endpoint hosts have joined an enterprise network, wherein the plurality of endpoint hosts comprise at least a first host and a second host, wherein each of the first host and the second host are assigned a corresponding address within a common subnet associated with the enterprise network, and the first and second hosts are endpoints in the enterprise network;
   responsive to the discovering the first host, assigning to the first host a first role from a plurality of roles within the common subnet;
   responsive to the discovering the second host, assigning to the second host a second role from the plurality of roles;
   accessing a policy configuration defining allowable communications between endpoint hosts based on their respective roles;
   dynamically generating, responsive to the discovering the first and second hosts, instructions based on the policy; and
   providing the instructions to the one or more switches causing the one or more switches to permit or deny communication of data packets using the common subnet between the first and second hosts based on the first role and the second role.

2. The non-transitory computer-readable medium of claim 1, wherein the first role is a provider and the second role is a subscriber.

3. The non-transitory computer-readable medium of claim 1, the operations further comprising defining allowable communications as being only between endpoint hosts having different roles within the common subnet.

4. The non-transitory computer-readable medium of claim 1, wherein the first host is associated with a headquarter site, and wherein the first host manages other endpoint hosts assigned the second role associated within the common subnet of the enterprise network.

5. The non-transitory computer-readable medium of claim 1, the operations further comprising:
   receiving notification from the one or more switches that the first host disconnected from the common subnet of the enterprise network;
   unregistering generated policies related to the first host that disconnected from the enterprise network;
   detecting that the first host rejoined the enterprise network at a subsequent time period;
   re-assigning the first host a new address within the common subnet associated with the enterprise network; and
   generating a new policy for the first host at the subsequent time period that the first host rejoined the enterprise network based on the new address, wherein the generated new policy includes re-assigning to the first host the first role or the second role associated with the enterprise network.

6. The non-transitory computer-readable medium of claim 1, wherein the first host is connected to a first site of the enterprise network and the second host is connected to a second site of the enterprise network.

7. The non-transitory computer-readable medium of claim 6, wherein the first role is determined based on the first site and the second role is determined based on the second site.

8. A system comprising: a processor; and a computer-readable device storing instructions which, when executed by the processor, cause the processor to perform operations comprising:
   discovering, based on one or more messages from one or more switches that a plurality of endpoint hosts have joined an enterprise network, wherein the plurality of endpoint hosts comprise at least a first host and a second host, wherein each of the first host and the second host are assigned a corresponding address within a common subnet associated with the enterprise network, and the first and second hosts are endpoints in the enterprise network;
   responsive to the discovering the first host, assigning to the first host a first role from a plurality of roles within the common subnet;
   responsive to the discovering the second host, assigning to the second host a second role from the plurality of roles;
   accessing a policy configuration defining allowable communications between endpoint hosts based on their respective roles;
   dynamically generating, responsive to the discovering the first and second hosts, instructions based on the policy; and
   providing the instructions to the one or more switches causing the one or more switches to permit or deny communication of data packets using the common subnet between the first and second hosts based on the first role and the second role.

9. The system of claim 8, wherein the first role is a provider and the second role is a subscriber.

10. The system of claim 8, the operations further comprising defining allowable communications as being only between endpoint hosts having different roles within the common subnet.

11. The system of claim 8, wherein the first host is associated with a headquarter site, and wherein the first host manages other endpoint hosts assigned the second role associated within the common subnet of the enterprise network.

12. The system of claim 8, the operations further comprising:

receiving notification from the one or more switches that the first host disconnected from the common subnet of the enterprise network;

unregistering generated policies related to the first host that disconnected from the enterprise network;

detecting that the first host rejoined the enterprise network at a subsequent time period;

re-assigning the first host a new address within the common subnet associated with the enterprise network; and generating a new policy for the first host at the subsequent time period that the first host rejoined the enterprise network based on the new address, wherein the generated new policy includes re-assigning to the first host the first role or the second role associated with the enterprise network.

13. The system of claim 8, wherein the first host is connected to a first site of the enterprise network and the second host is connected to a second site of the enterprise network.

14. The system of claim 13, wherein the first role is determined based on the first site and the second role is determined based on the second site.

15. A method comprising:

discovering, based on one or more messages from one or more switches, that a plurality of endpoint hosts have joined an enterprise network, wherein the plurality of endpoint hosts comprise at least a first host and a second host, wherein each of the first host and the second host are assigned a corresponding address within a common subnet associated with the enterprise network, and the first and second hosts are endpoints in the enterprise network;

responsive to the discovering the first host, assigning to the first host a first role from a plurality of roles within the common subnet;

responsive to the discovering the second host, assigning to the second host a second role from the plurality of roles;

accessing a policy configuration defining allowable communications between endpoint hosts based on their respective roles;

dynamically generating, responsive to the discovering the first and second hosts, instructions based on the policy; and providing the instructions to the one or more switches causing the one or more switches to permit or deny communication of data packets using the common subnet between the first and second hosts based on the first role and the second role.

16. The method of claim 15, wherein the first role is a provider and the second role is a subscriber.

17. The method of claim 15, further comprising defining allowable communications as being only between endpoint hosts having different roles within the common subnet.

18. The method of claim 15, wherein the first host and is associated with a headquarter site, and wherein the first host manages other endpoint hosts assigned the second role associated within the common subnet of the enterprise network.

19. The method of claim 15, further comprising:

receiving notification from the one or more switches that the first host disconnected from the common subnet of the enterprise network;

unregistering generated policies related to the first host that disconnected from the enterprise network;

detecting that the first host rejoined the enterprise network at a subsequent time period;

re-assigning the first host a new address within the common subnet associated with the enterprise network; and generating a new policy for the first host at the subsequent time period that the first host rejoined the enterprise network based on the new address, wherein the generated new policy includes re-assigning to the first host the first role or the second role associated with the enterprise network.

20. The method of claim 15, wherein the first host is connected to a first site of the enterprise network and the second host is connected to a second site of the enterprise network.

21. The method of claim 20, wherein the first role is determined based on the first site and the second role is determined based on the second site.

* * * * *